United States Patent [19]
Morgan et al.

[11] Patent Number: 5,436,998
[45] Date of Patent: Jul. 25, 1995

[54] ASSEMBLY FOR ROUTING FIBER OPTIC CABLES ACROSS A HOUSING INTERIOR

[75] Inventors: Douglas V. Morgan, Cary, N.C.; Troy W. Glover, Plano, Tex.

[73] Assignee: Alcatel Network Systems, Inc., Richardson, Tex.

[21] Appl. No.: 282,877

[22] Filed: Jul. 29, 1994

[51] Int. Cl.[6] .......................... G02B 6/00; G02B 6/36
[52] U.S. Cl. ...................................... 385/92; 385/147
[58] Field of Search ............................ 385/88–92, 385/134–137, 147

[56] References Cited

U.S. PATENT DOCUMENTS

| | | | |
|---|---|---|---|
| 4,976,510 | 12/1990 | Davila et al. | 385/92 X |
| 5,011,246 | 4/1991 | Corradetti et al. | 385/92 |
| 5,140,663 | 8/1992 | Edwards et al. | 385/92 X |
| 5,212,760 | 5/1993 | Goetz | 385/147 X |
| 5,263,108 | 11/1993 | Kurokawa et al. | 385/92 X |
| 5,289,555 | 2/1994 | Sanso | 385/92 |
| 5,351,329 | 9/1994 | Moore et al. | 385/92 |
| 5,361,384 | 11/1994 | Stepan | 385/147 X |

*Primary Examiner*—Akm E. Ullah
*Attorney, Agent, or Firm*—Vinson & Elkins

[57] ABSTRACT

An assembly for routing fiber optic cables transversely across an electronics housing interior. The electronics housing interior supports circuit boards, some of which are optically coupled to the fiber optic cables requiring routing. The assembly includes a support member for coupling with the housing interior, and this support member is pivotally coupled to a fiber optic cable retaining member. The fiber optic cable retaining member routes the fiber optic cables across the housing interior, and it can be pivoted away from the electronics housing, enabling one to remove a circuit board for service, testing, or replacement without handling of or with minimal handling of individual fiber optic cables. A cover is pivotally coupled to the fiber optic cable retaining member, and it can be opened to facilitate the routing of the fiber optic cables or closed to protect the routed fiber optic cables.

19 Claims, 4 Drawing Sheets

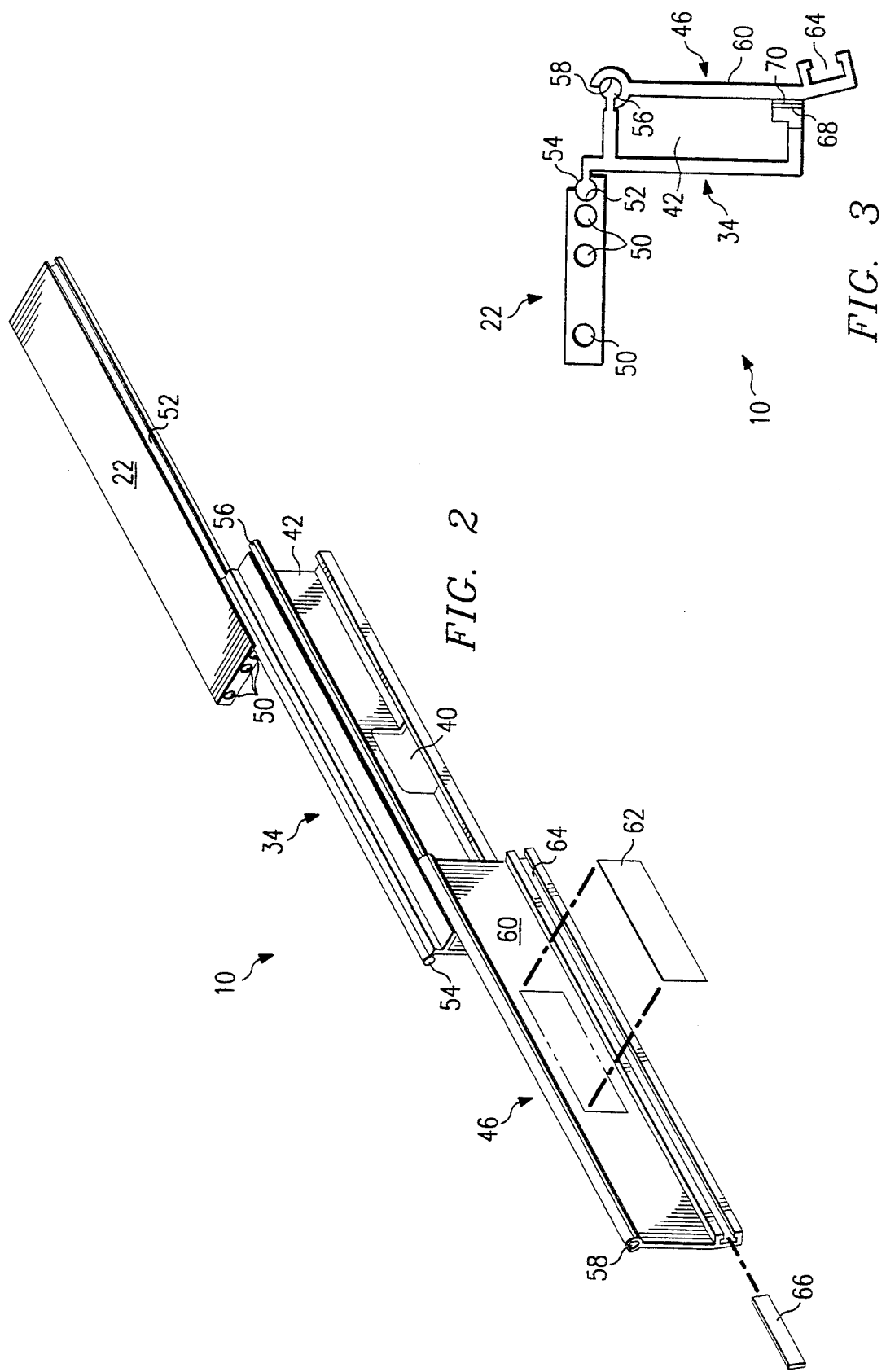

ASSEMBLY FOR ROUTING FIBER OPTIC CABLES ACROSS A HOUSING INTERIOR

This invention relates generally to assemblies for routing fiber optic cables transversely across an electronics housing interior, and is more particularly directed to (1) the protection of fiber optic cables routed in this manner and (2) the packaging of such fiber optic cables from a marketing perspective.

BACKGROUND OF THE INVENTION

The present invention addresses a well-known need in the electronics and fiber optics industries. Typically, fiber optic cables optically coupled to circuit boards within an electronics housing are routed across the face of the interior of the electronics housing until they reach a vertical duct, often located at one side of the electronics housing. As the number of fiber optic cables to be so routed increases, the face of an electronics housing becomes increasingly crowded with fiber optic cables. This crowding creates several problems.

Due to its routing across the face of the housing, one must move or handle a particular fiber optic cable in order to remove a circuit board from the housing for service, testing, or replacement. This moving or handling of the fiber optic cable increases the chance for breakage, and each time a fiber optic cable breaks, the broken pieces of the cable must be repaired, such as by splicing the pieces together. Fiber optic cable splices decrease the optical performance of such cables, as is well known in the art. In addition, if a particular fiber optic cable breaks twice, one must typically remove the broken cable from the housing and route an entirely new cable through the housing in order to achieve the desired optical performance. Both the splicing and re-routing operations increase service time and service costs.

This crowding of fiber optic cables also creates a marketing problem for manufacturers of electronics products. Having a mass of fiber optic cables routed across the face of an electronics housing is often not aesthetically pleasing to the customer. This aesthetic problem can have detrimental effects on both sales and customer satisfaction.

It is therefore an object of the present invention to provide an assembly for routing fiber optic cables optically connected to circuit boards within an electronics housing transversely across the housing interior.

It is a further object of the present invention to provide such an assembly which can be pivoted away from the housing interior so that the circuit boards within the housing can be removed for service, testing, or replacement without handling of or with minimal handling of individual fiber optic cables.

It is a further object of the present invention to provide such an assembly which neatly packages and identifies the particular fiber optic cables routed in this manner.

Still other objects and advantages of the present invention will become apparent to those of ordinary skill in art having references to the following specification together with its drawings.

SUMMARY OF THE INVENTION

The present invention provides an assembly for routing fiber optic cables transversely across an electronics housing interior, where such fiber optic cables are optically coupled to circuit boards supported in the electronics housing. The invention includes a support member for coupling with the housing interior and for supporting circuit boards. The invention also includes a fiber optic cable retaining member pivotally coupled to the front of the support member. This retaining member has an axial interior for routing the fiber optic cables across the housing interior and at least one opening providing access between the routed cables and the circuit boards within the electronics housing.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a partially exploded, perspective view of the preferred fiber optic routing assembly of the present invention;

FIG. 3 is a side view of the preferred fiber optic routing assembly of the present invention;

DETAILED DESCRIPTION OF THE PREFERRED EMBODIMENT

The preferred embodiment of the present invention and its advantages are best understood by referring to FIGS. 1-5 of the drawings, like numerals being used for like and corresponding parts of the various drawings.

Figure 1:
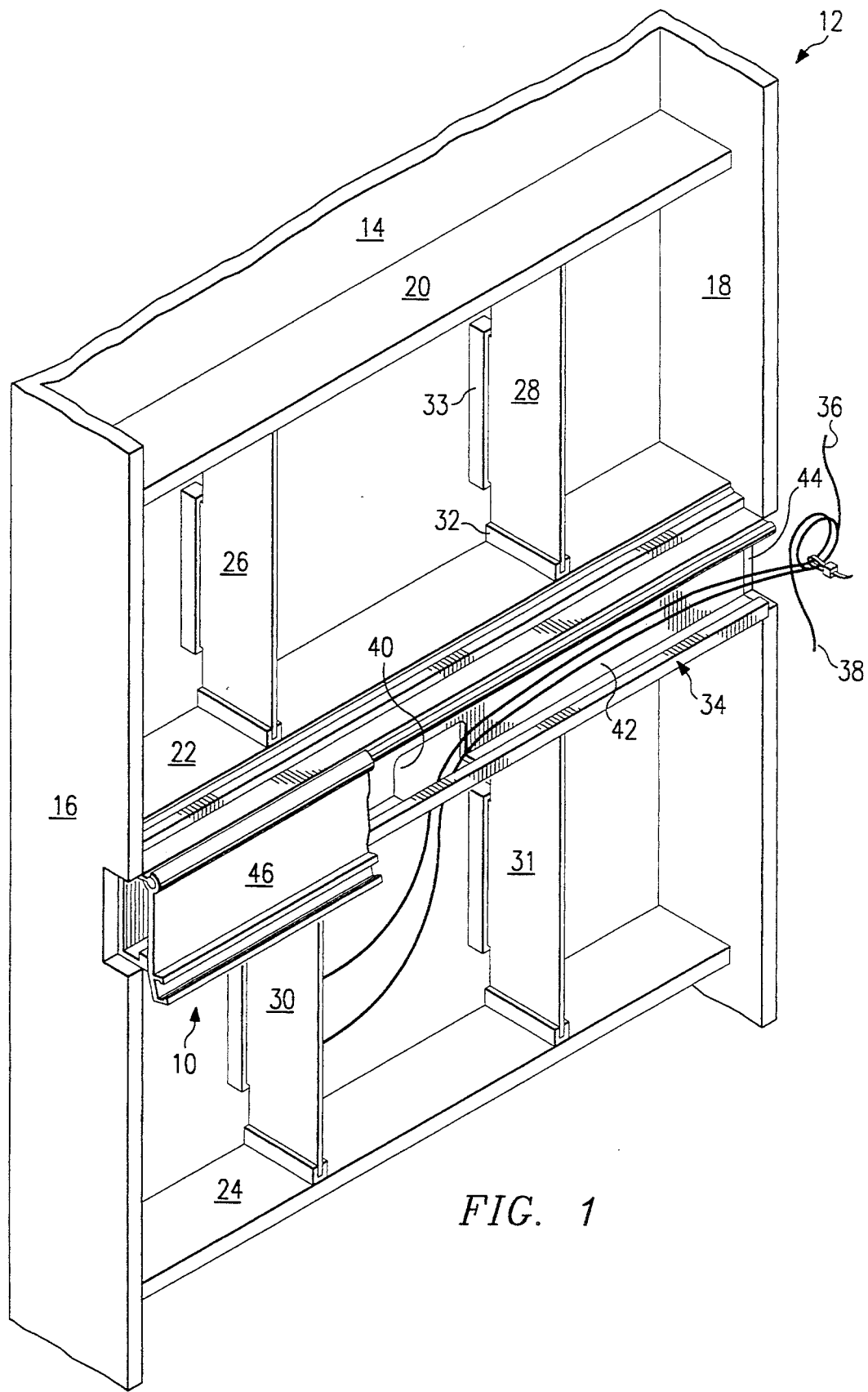
FIG. 1 is a perspective view of the preferred fiber optic routing assembly of the present invention disposed in the interior of an electronics housing and routing two fiber optic cables transversely across the housing interior.

FIG. 1 illustrates a fiber optic routing assembly 10 mounted within an electronics housing 12 in accordance with the present invention. Electronics housing 12 has a back plane 14, a side plate 16, a side plate 18, and three horizontal support members 20, 22, and 24. In addition, although not shown in FIG. 1, electronics housing 12 also has a top plate and a bottom plate. Although three horizontal support members 20, 22, and 24 are shown in FIG. 1, this number is by way of example, and the exact number of such members is not critical to the present invention. Moreover, the exact geometry of electronics housing 12 is also not critical to the present invention.

Two circuit boards 26 and 28 are supported within electronics housing 12 between horizontal support member 20 and horizontal support member 22. In addition, two circuit boards 30 and 31 are supported within electronics housing 12 between horizontal support member 22 and horizontal support member 24. Circuit boards 26, 28, 30, and 31 are positioned on their respective horizontal support members using circuit board guide flanges 32. In addition, although not shown in FIG. 1, circuit boards 26, 28, 30, and 31 also include an electrical interface for coupling to a mating connector 33 located on back plane 14, as known in the art. Although only four circuit boards are shown supported within electronics housing 12 by passing through FIG. 1, this number is by way of example, and the present invention is operable with any number of circuit boards.

A fiber optic cable retaining member 34 is pivotally coupled to horizontal support member 22 within electronics housing 12. As detailed below, fiber optic cables 36 and 38 are routed transversely across the interior of electronics housing 12 through retaining member 34. Specifically, fiber optic cables 36 and 38 originate at circuit board 30, are routed through cable opening 40 of retaining member 34, are routed transversely across the interior of electronics housing 12 in axial interior 42 of retaining member 34, and leave electronics housing 12 through side plate opening 44. A cover 46 encloses retaining member 34. Cover 46 is shown partially cutaway in FIG. 1 to illustrate the routing of fiber optic cables 36 and 38.

One should note that only two fiber optic cables are shown routed in FIG. 1 for clarity of illustration, and a typical electronics housing 12 will often have many more fiber optic cables requiring routing. In addition, although not shown in FIG. 1, after exiting electronics housing 12 through side plate opening 44, fiber optic cables 36 and 38 are typically routed to a given destination through a vertical duct located between side plate 18 and another electronics housing similar to electronics housing 12. Furthermore, although FIG. 1 shows only retaining member 34 pivotally coupled to horizontal support member 22, other retaining members identical to retaining member 34 could also be pivotally coupled to horizontal support members 20 and 24 as is desirable given the particular electronics housing 12.

FIGS. 2 and 3 illustrate the construction and mechanical connection of the component parts of fiber optic routing assembly 10 of the present invention. Horizontal support member 22 is preferably a generally rectangular member extruded from aluminum. Three support holes 50 are preferably located on each end of horizontal support member 22, and sheet metal screws (not shown) are preferably inserted through side plates 16 and 18 into support holes 50 to couple horizontal support member 22 to electronics housing 12. The front edge of horizontal support member 22 is preferably extruded with a female three-quarter round 52. Female three-quarter round 52 preferably has a diameter slightly greater than one-eighth of an inch.

For purposes of illustration in FIG. 2, fiber optic cable retaining member 34 is only partially coupled to horizontal support member 22. Fiber optic cable retaining member 34 is preferably a generally C-shaped member extruded from aluminum. Retaining member 34 preferably has a rear male axial round 54 having a diameter of one-eighth of an inch. Rear, male axial round 54 couples with female three-quarter round 52. This coupling supports retaining member 34 below horizontal support member 22 and allows retaining member 34 to pivot up and away from horizontal support member 22.

Retaining member 34 has an axial interior 42 for supporting fiber optic cables 36 and 38 and a cable opening 40 for passing cables 36 and 38 to circuit boards 30 and 31 when fiber optic routing assembly 10 is mounted within electronics housing 12, as shown in FIG. 1. Axial interior 42 preferably has a depth of approximately three-eighths of an inch. Although only one cable opening 40 is shown in FIG. 2, retaining member 34 can be made with multiple cable openings. The number of cable openings 40 is preferably a function of the positioning of circuit boards within electronics housing 12 and the number of fiber optic cables which need to be routed transversely across electronics housing 12. Retaining member 34 also preferably has a front, male axial round 56 for coupling with cover 46. Front, male axial round 56 preferably has a diameter of one-eighth of an inch.

For purposes of illustration in FIG. 2, cover 46 is only partially coupled with retaining member 34. Cover 46 is preferably a generally rectangular member extruded from aluminum. A female three-quarter round 58 is preferably located near the top of cover 46 for pivotally coupling with front male axial round 56 of retaining member 34. Female three-quarter round 58 preferably has a diameter of slightly greater than one-eighth of an inch. Cover 46 can be pivoted up and away from retaining member 34 to expose cable opening 40 and axial interior 42. This pivoting allows one to route fiber optic cables 36 and 38 from circuit board 30, through cable opening 40, into axial interior 42, across electronics housing 12, and out side plate opening 44, as shown in FIG. 1.

Cover 46 also has an outside surface 60. As shown in FIG. 2, a designator label 62 can be adhesively coupled to outside surface 60 to designate the particular fiber optic cables routed through retaining member 34. In addition, an axial designator strip retainer 64 is preferably located near the bottom of cover 46. The particular fiber optic cables routed through retaining member 34 can be alternatively identified by sliding a designator strip 66 into axial designator strip retainer 64.

As shown in FIG. 3, a first VELCRO piece 68 is adhesively coupled to the bottom end of retaining member 34 near the point where cover 46 contacts retaining member 34 in the closed position. A second VELCRO piece 70 is located at a similar position on cover 46. VELCRO pieces 68 and 70 cooperate to ensure that cover 46 encloses the fiber optic cables within axial interior 42 at all appropriate times.

Figure 4:
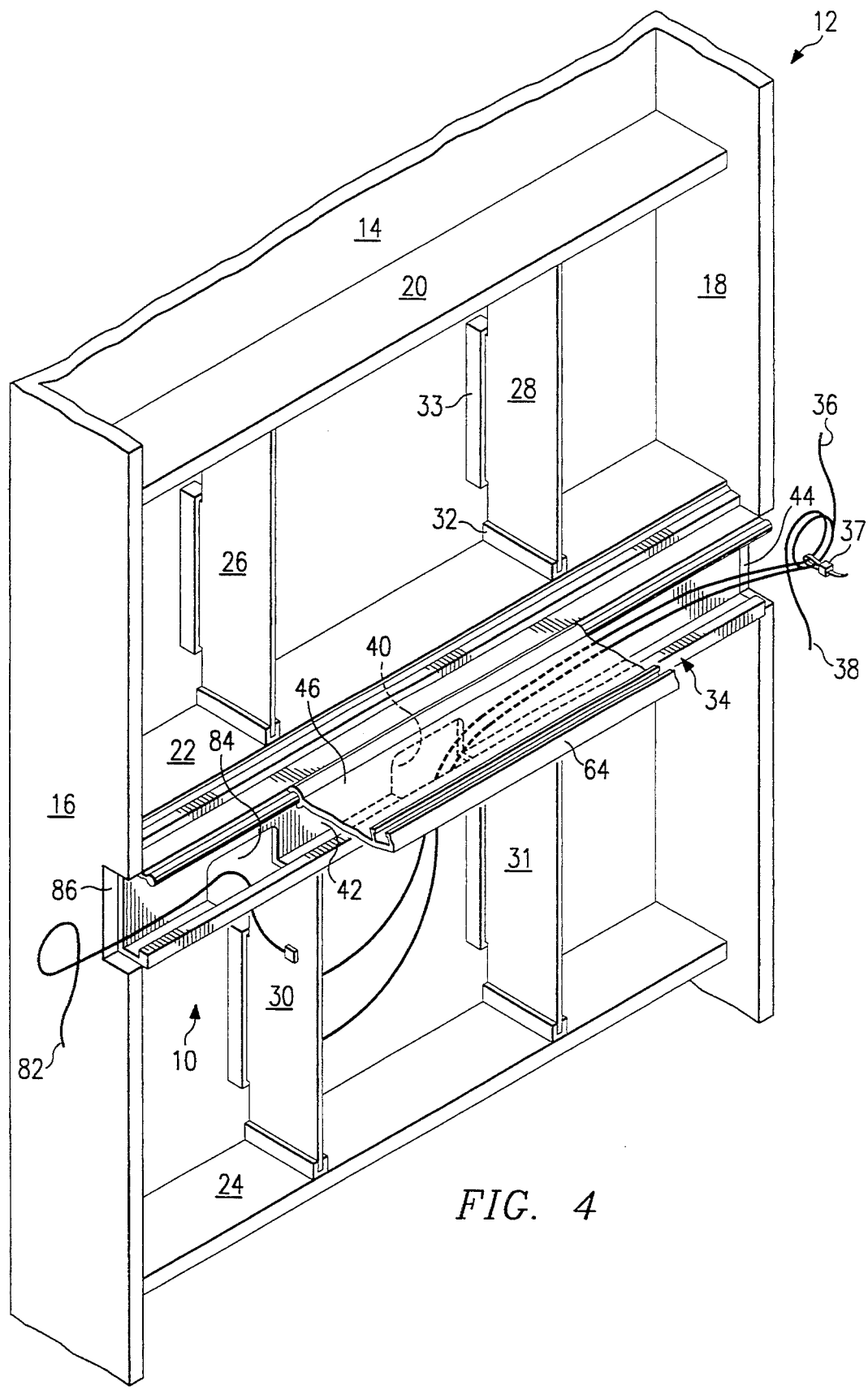
FIG. 4 is an operational view of FIG. 1 with the preferred cover of the preferred fiber optic routing assembly of the present invention pivoted to allow routing of a third fiber optic cable across the housing interior.

The operation of the preferred embodiment of the present invention will now be discussed with reference to FIGS. 1-5. FIG. 4 illustrates the routing of a fiber optic cable 82 across the interior of electronics housing 12. First, one grasps axial designator strip retainer 64 and pivots cover 46 up and away from retaining member 34. Cover 46 is shown partially cutaway in FIG. 4 for clarity of illustration. Fiber optic cable 82 is routed from circuit board 30, through cable opening 84, into axial interior 42, across the interior of electronics housing 12, and out side plate opening 86. After fiber optic cable 82 has been completely routed, cover 46 is pivoted downward until velcro pieces 68 and 70 interconnect, thus enclosing axial interior 42 of retaining member 34, as shown in FIG. 3.

As also shown in FIG. 4, fiber optic cables 36, 38, and 82 are routed with some degree of slack in the vertical ducts outside of side plate openings 44 and 86. In addition, fiber optic cables 36 and 38 are preferably coupled together with a tie-wrap 37 at a point near where such slack exists.

Figure 5:
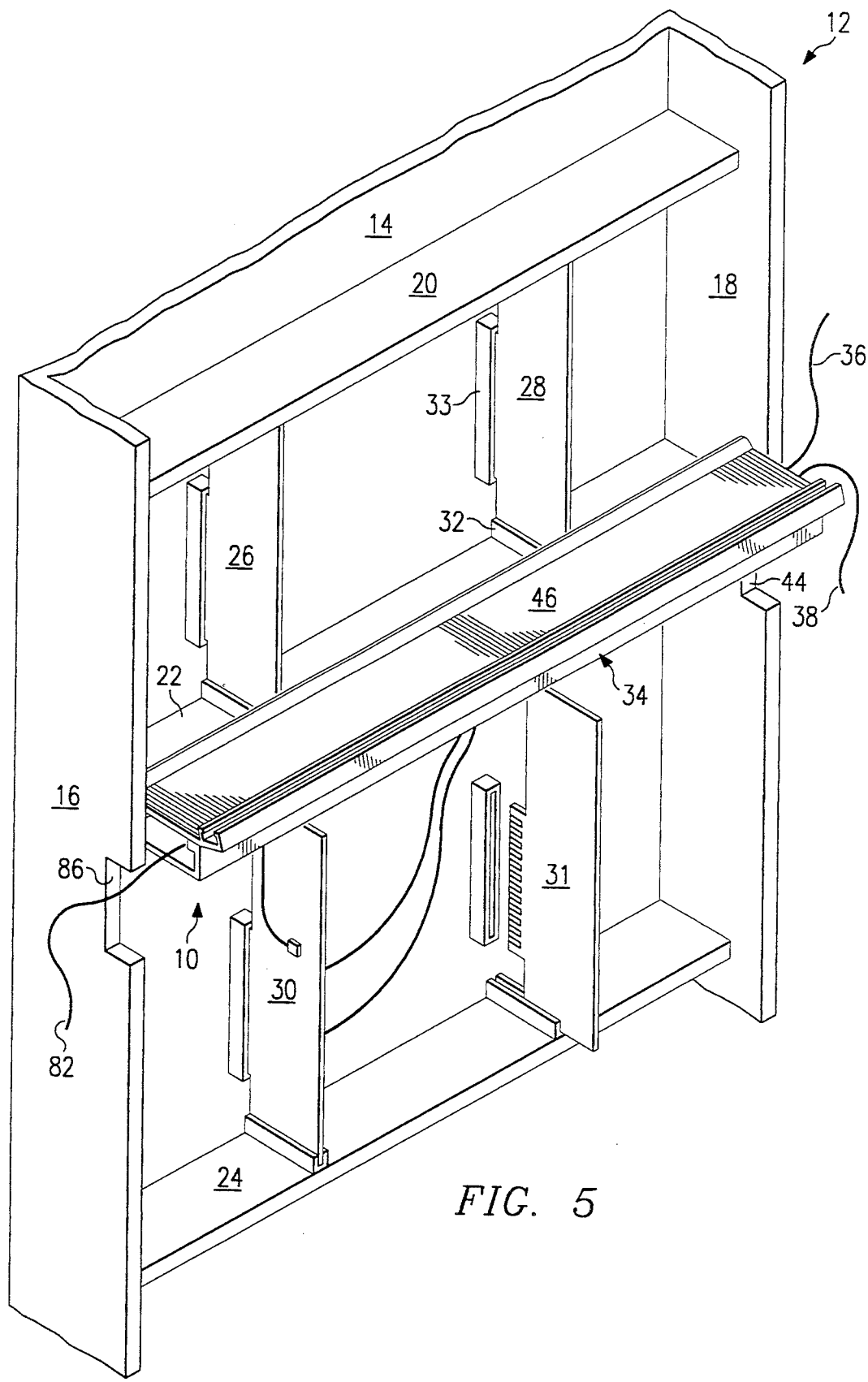
FIG. 5 is an operational view of FIG. 1 illustrating the pivoting of the preferred fiber optic routing assembly of the present invention to allow removal of a circuit board for service, testing, or replacement.

FIG. 5 illustrates the use of the present invention to provide access to circuit boards 30 and 31 for service, testing, or replacement. As shown in FIG. 5, retaining member 34 is pivoted up and away from support member 22. When retaining member 34 is so pivoted, the degree of slack in fiber optic cables 36, 38, and 82 prevents theses cables from binding. The degree of slack in fiber optic cables 36, 38, and 82 also minimizes any stress on these cables associated with the pivoting of retaining member 34.

When retaining member 34 is pivoted in the upward position, neither retaining member 34 nor fiber optic cables 36, 38, or 82 are disposed across any portion of circuit boards 30 and 31 supported in electronics housing 12. Therefore, circuit board 31 can be removed from electronics housing 12 for service, testing, or replacement without individually handling or moving fiber optic cables 36, 38, and 82. Similarly, circuit board 30 can be removed from electronics housing 12 for service, testing, or replacement with only minimal, individual handling of fiber optics cables 36, 38, and 82. The only such handling required is to disconnect fiber optic cables 36, 38, and 82 from circuit board 30 before removal. Fiber optic routing assembly 10 thus functions to minimize the likelihood of damage to fiber optic cables 36, 38, and 82 during this process. As mentioned previously, fiber optic cables 36, 38, and 82 are merely illustrative, and a typical electronics housing such as electronics housing 12 will often require the routing of a significantly higher number of fiber optic cables.

From the above, it may be appreciated that this embodiment of the present invention routes fiber optic cables transversely across an electronics housing interior. The present invention minimizes the potential for damage to the routed fiber optic cables during service, testing, or replacement of the circuit boards within the electronics housing interior. Furthermore, the present invention provides an aesthetically pleasing packaging and convenient identification of all fiber optic cables routed transversely across an electronics housing. Note that the invention is illustrated herein by example, and various modifications may be made by a person of ordinary skill in the art. For example, numerous dimensions and/or geometries could be altered to accommodate a given configuration. As another example, various couplings could be substituted while still achieving an equivalent function. Consequently, while the present invention has been described in detail, various substitutions, modifications, or alterations could be made to the description set forth above without departing from the invention which is defined by the following claims.

What is claimed is:

1. An assembly for routing fiber optic cables in a generally transverse direction across a housing interior, said housing interior supporting said assembly and a plurality of circuit boards generally disposed to one side of said assembly, at least one of said plurality of circuit boards optically coupled to at least one of said fiber optic cables, said assembly comprising:

a support member for coupling with said housing interior; and a fiber optic cable retaining member pivotally coupled with said support member, said retaining member comprising an axial interior for routing said at least one of said fiber optic cables in said generally transverse direction and at least one opening providing access to said housing interior and said plurality of circuit boards.

2. The assembly of claim 1 and further comprising a cover coupled with said retaining member for providing access into said axial interior of said retaining member.

3. The assembly of claim 2 wherein:
   said retaining member comprises an axial, male round; and
   said cover comprises an axial, female, three-quarter round pivotally coupled with said male round of said retaining member,
   so that said cover can be pivoted away from said retaining member for routing said at least one of said fiber optic cables through said at least one opening and into said axial interior.

4. The assembly of claim 1 wherein:
   said support member comprises an axial, female, three-quarter round; and
   said retaining member comprises an axial, male round pivotally coupled with said female, three-quarter round of said support member,
   so that said retaining member can be pivoted away from said support member to allow removal of said circuit boards not optically coupled to said at least one of said fiber optic cables without individually moving or handling said at least one of said fiber optic cables routed through said at least one opening into said axial interior.

5. The assembly of claim 1 wherein:
   said support member comprises an axial, female, three-quarter round; and
   said retaining member comprises an axial, male round pivotally coupled with said female, three-quarter round of said support member,
   so that said retaining member can be pivoted away from said support member to allow removal of said at least one of said plurality of circuit boards optically coupled to said at least one of said fiber optic cables with minimal, individual moving or handling of said at least one of said fiber optic cables routed through said at least one opening into said axial interior.

6. The assembly of claim 2 wherein said support member, said fiber optic cable retaining member, and said cover comprise aluminum extrusions.

7. An assembly for routing fiber optic cables in a generally transverse direction across a housing interior, said housing interior comprising a first horizontal support member and a plurality of circuit boards disposed above said first horizontal support member, at least one of said plurality of circuit boards optically coupled to respective ones of said fiber optic cables, said assembly comprising:

a second horizontal support member for coupling with said housing interior, said second horizontal support member disposed in spaced, generally parallel relation above said first horizontal support member, so that said first and second horizontal support members support said plurality of circuit boards between said first and second horizontal support members;

a fiber optic cable retaining member pivotally coupled with said second horizontal support member and extending below said second horizontal support member, said retaining member comprising an axial interior for routing said fiber optic cables in said generally transverse direction, said retaining member comprising at least one opening providing access to said housing interior and said plurality of circuit boards supported between said first and second horizontal support members; and a cover coupled with said retaining member for providing access to said axial interior of said retaining member.

8. The assembly of claim 7 wherein:

said retaining member comprises an axial, male round; and said cover comprises an axial, female, three-quarter round pivotally coupled with said male round of said retaining member, so that said cover can be pivoted away from said retaining member for routing said fiber optic cables through said at least one opening and into said axial interior.

9. The assembly of claim 7 wherein:

said second horizontal support member comprises an axial, female, three-quarter round; and said retaining member comprises an axial, male round pivotally coupled with said female, three-quarter round of said second horizontal support member, so that said retaining member can be pivoted away from said second horizontal support member to allow removal of said circuit boards not optically coupled to said fiber optic cables without individually moving or handling said fiber optic cables routed through said at least one opening into said axial interior.

10. The assembly of claim 7 wherein:

said second horizontal support member comprises an axial, female, three-quarter round; and said retaining member comprises an axial, male round pivotally coupled with said female, three-quarter round of said second horizontal support member, so that said retaining member can be pivoted away from said second horizontal support member to allow removal of said at least one of said plurality of circuit boards optically coupled to said respective ones of said fiber optic cables with minimal, individual moving or handling of said fiber optic cables routed through said at least one opening into said axial interior.

11. The assembly of claim 7 wherein said cover comprises an outside surface for coupling with a label identifying said fiber optic cables routed through said axial interior.

12. The assembly of claim 7 wherein said cover comprises:

a first flange on an outside surface of said cover; and a second flange on said outside surface disposed in spaced, generally parallel relation to said first flange, wherein said first and second flanges are operable to removably couple with a labeling member identifying said fiber optic cables routed through said axial interior.

13. The assembly of claim 8 and further comprising securing apparatus for removably coupling said cover to said retaining member when said cover is pivoted to enclose said retaining member.

14. The assembly of claim 7 wherein said second horizontal support member, said fiber optic cable retaining member, and said cover comprise aluminum extrusions.

15. The assembly of claim 7 wherein:

said second horizontal support member comprises a first, axial, female, three-quarter round;

said retaining member comprises:
a first, axial, male round pivotally coupled with said first, female, three-quarter round of said second horizontal support member; and
a second, axial, male round; and said cover comprises a second, axial, female, three-quarter round pivotally coupled with said second, male round of said retaining member, so that said cover can be pivoted away from said retaining member for routing said fiber optic cables through said at least one opening and into said axial interior; and so that said retaining member can be pivoted away from said second horizontal support member to allow removal of said circuit boards not optically coupled to said fiber optic cables without individually moving or handling said fiber optic cables routed through said at least one opening into said axial interior.

16. The assembly of claim 7 wherein:

said second horizontal support member comprises a first, axial, female, three-quarter round;

said retaining member comprises:
a first, axial, male round pivotally coupled with said first, female, three-quarter round of said second horizontal support member; and
a second, axial, male round; and said cover comprises a second, axial, female, three-quarter round pivotally coupled with said second, male round of said retaining member, so that said cover can be pivoted away from said retaining member for routing said fiber optic cables through said at least one opening and into said axial interior; and so that said retaining member can be pivoted away from said second horizontal support member to allow removal of said at least one of said plurality of circuit boards optically coupled to said respective ones of said fiber optic cables with minimal, individual moving or handling of said fiber optic cables routed through said at least one opening into said axial interior.

17. A method for routing fiber optic cables in a generally transverse direction across a circuit board housing, comprising the steps of:

providing a support member for coupling with said housing;

providing a fiber optic cable retaining member pivotally coupled with said support member and comprising at least one opening providing access to circuit boards within said housing;

providing a cover pivotally coupled with said retaining member;

pivoting said cover to provide access within said retaining member and to at least one said opening;

routing respective ones of said fiber optic cables from respective ones of said circuit boards through said at least one opening and into said retaining member;

routing said fiber optic cables through said retaining member in said generally transverse direction; and pivoting said cover to enclose said fiber optic cables within said retaining member.

18. The method of claim 17 and further comprising the step of pivoting said retaining member away from said support member so that said circuit boards not optically coupled to said fiber optic cables can be removed from said housing without individually moving or handling said fiber optic cables routed through said retaining member.

19. The method of claim 17 and further comprising the step of pivoting said retaining member away from said support member so that said respective ones of said circuit boards from which said respective ones of said fiber optic cables are routed can be removed from said housing with minimal, individual moving or handling of said fiber optic cables routed through said retaining member.

* * * * *